(12) United States Patent
Stewart (10) Patent No.: US 10,278,028 B2
(45) Date of Patent: Apr. 30, 2019

(54) SYSTEM AND METHOD FOR MONITORING LOCATIONS OF MOBILE DEVICES

(71) Applicant: QUALCOMM Incorporated, San Diego, CA (US)

(72) Inventor: William K. Stewart, San Francisco, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 15/612,340

(22) Filed: Jun. 2, 2017

(65) Prior Publication Data

US 2017/0272916 A1 Sep. 21, 2017

Related U.S. Application Data

(62) Division of application No. 14/788,497, filed on Jun. 30, 2015, now Pat. No. 9,712,978, which is a division
(Continued)

(51) Int. Cl.
*H04W 24/00* (2009.01)
*H04W 4/04* (2009.01)
*H04M 1/725* (2006.01)
*H04W 8/00* (2009.01)
*H04W 68/00* (2009.01)

(52) U.S. Cl.
CPC ......... *H04W 4/04* (2013.01); *H04M 1/72572* (2013.01); *H04W 8/005* (2013.01); *H04W 68/005* (2013.01)

(58) Field of Classification Search
CPC ..... H04W 12/12; H04W 12/06; H04W 64/00; H04W 4/02; H04L 29/08108
See application file for complete search history.

(56) References Cited

U.S. PATENT DOCUMENTS

| 4,279,021 A | 7/1981 | See et al. |
| 4,415,065 A | 11/1983 | Sandstedt |
| (Continued) | | |

FOREIGN PATENT DOCUMENTS

| EP | 0149762 A1 | 7/1985 |
| EP | 0611239 A1 | 8/1994 |
| (Continued) | | |

OTHER PUBLICATIONS

"3GPP2 Multimedia Messaging System—MMS Specification Overview—Revision: A" [online], May 2003, Mobile Messaging, [retrieved on Dec. 10, 2004]. Retrieved from the Internet:<URL:http://www.lebodic.net/left.htm>.
(Continued)

*Primary Examiner* — Stephen M D Agosta
(74) *Attorney, Agent, or Firm* — Norton Rose Fulbright LLP (57) ABSTRACT

A method of identifying mobile computing devices includes sending a request from a first mobile computing device to a second mobile computing device for the location of the second mobile computing device, and receiving the location of the second mobile computing device at the first mobile computing device. The method further includes providing a notification to one of the first and second mobile computing devices based upon the location of the second mobile computing device.

19 Claims, 5 Drawing Sheets

Related U.S. Application Data of application No. 11/786,550, filed on Apr. 11, 2007, now abandoned.

(56) References Cited

U.S. PATENT DOCUMENTS

| | | |
|---|---|---|
| 4,587,630 A | 5/1986 | Straton et al. |
| 4,725,694 A | 2/1988 | Auer et al. |
| 4,764,770 A | 8/1988 | Church |
| 4,887,212 A | 12/1989 | Zamora et al. |
| 4,892,981 A | 1/1990 | Soloway et al. |
| 4,907,290 A | 3/1990 | Crompton |
| 4,916,441 A | 4/1990 | Gombrich |
| 5,010,547 A | 4/1991 | Johnson et al. |
| 5,012,219 A | 4/1991 | Henry |
| 5,067,164 A | 9/1991 | Denker et al. |
| D320,598 S | 10/1991 | Auerbach |
| 5,075,684 A | 12/1991 | Deluca |
| 5,101,439 A | 3/1992 | Kiang |
| 5,218,188 A | 6/1993 | Hanson |
| 5,227,614 A | 7/1993 | Danielson et al. |
| 5,333,266 A | 7/1994 | Boaz et al. |
| 5,334,824 A | 8/1994 | Martinez |
| 5,335,276 A | 8/1994 | Thompson et al. |
| 5,336,001 A | 8/1994 | Lichtenberg |
| 5,345,615 A | 9/1994 | Garofalo |
| 5,357,065 A | 10/1994 | Mitamura et al. |
| 5,359,317 A | 10/1994 | Gomez et al. |
| 5,379,057 A | 1/1995 | Clough et al. |
| 5,392,447 A | 2/1995 | Schlack et al. |
| 5,394,140 A | 2/1995 | Wong et al. |
| D359,920 S | 7/1995 | Masaharu |
| 5,430,436 A | 7/1995 | Fennell |
| 5,444,450 A * | 8/1995 | Olds ............... G01S 5/12 342/357.21 |
| 5,465,401 A | 11/1995 | Thompson |
| 5,467,388 A * | 11/1995 | Redd, Jr. ............... H04M 1/663 379/196 |
| 5,494,363 A | 2/1996 | Hochgesang |
| 5,503,484 A | 4/1996 | Louis |
| 5,539,317 A | 7/1996 | Janning |
| 5,561,836 A * | 10/1996 | Sowles ............... H04B 7/18545 342/357.43 |
| 5,594,796 A | 1/1997 | Grube et al. |
| 5,612,682 A | 3/1997 | Deluca et al. |
| 5,650,776 A | 7/1997 | Mitchell et al. |
| 5,699,244 A | 12/1997 | Clark, Jr. et al. |
| 5,705,995 A | 1/1998 | Laflin et al. |
| 5,708,655 A | 1/1998 | Toth et al. |
| 5,742,894 A | 4/1998 | Jambhekar et al. |
| 5,779,030 A | 7/1998 | Ikegami et al. |
| 5,812,651 A | 9/1998 | Kaplan |
| 5,813,778 A | 9/1998 | Shih |
| 5,850,187 A | 12/1998 | Carrender et al. |
| 5,852,187 A | 12/1998 | Thorner et al. |
| 5,875,434 A | 2/1999 | Matsuoka et al. |
| 5,884,168 A | 3/1999 | Kolev et al. |
| 5,901,211 A | 5/1999 | Dean et al. |
| 5,901,358 A | 5/1999 | Petty et al. |
| 5,903,852 A | 5/1999 | Schaupp, Jr. et al. |
| 5,905,863 A | 5/1999 | Knowles et al. |
| 5,917,906 A | 6/1999 | Thornton |
| 5,918,159 A | 6/1999 | Fomukong et al. |
| 5,929,848 A | 7/1999 | Albukerk et al. |
| 5,936,614 A | 8/1999 | An et al. |
| 5,938,721 A | 8/1999 | Dussell et al. |
| 5,941,648 A | 8/1999 | Robinson et al. |
| 5,958,006 A | 9/1999 | Eggleston et al. |
| 5,966,652 A | 10/1999 | Coad et al. |
| 5,974,330 A | 10/1999 | Negishi |
| D416,256 S | 11/1999 | Griffin et al. |
| 6,016,476 A | 1/2000 | Maes et al. |
| 6,038,547 A | 3/2000 | Casto |
| 6,044,275 A | 3/2000 | Boltz et al. |
| 6,047,579 A | 4/2000 | Schmitz |
| 6,055,510 A | 4/2000 | Henrick et al. |
| 6,058,304 A | 5/2000 | Callaghan et al. |
| 6,061,346 A | 5/2000 | Nordman |
| 6,061,561 A | 5/2000 | Alanara et al. |
| 6,085,101 A | 7/2000 | Jain et al. |
| 6,101,531 A | 8/2000 | Eggleston et al. |
| 6,104,291 A | 8/2000 | Beauvillier et al. |
| 6,111,538 A | 8/2000 | Schuchman et al. |
| 6,151,507 A | 11/2000 | Laiho et al. |
| 6,157,630 A | 12/2000 | Adler et al. |
| 6,166,342 A | 12/2000 | Chou |
| 6,177,905 B1 | 1/2001 | Welch |
| 6,182,010 B1 | 1/2001 | Berstis |
| 6,182,221 B1 | 1/2001 | Hsu et al. |
| 6,198,053 B1 | 3/2001 | Chou |
| 6,226,362 B1 | 5/2001 | Gerszberg et al. |
| 6,230,197 B1 | 5/2001 | Beck et al. |
| 6,243,689 B1 | 6/2001 | Norton |
| 6,246,376 B1 | 6/2001 | Bork et al. |
| 6,256,631 B1 | 7/2001 | Malcolm |
| 6,259,405 B1 | 7/2001 | Stewart et al. |
| 6,259,931 B1 | 7/2001 | Singh |
| 6,278,442 B1 | 8/2001 | Griffin et al. |
| 6,295,372 B1 | 9/2001 | Hawkins et al. |
| 6,297,737 B1 | 10/2001 | Irvin |
| 6,304,636 B1 | 10/2001 | Goldberg et al. |
| 6,304,753 B1 | 10/2001 | Hartmaier |
| 6,307,919 B1 | 10/2001 | Yoked |
| 6,310,609 B1 | 10/2001 | Morgenthaler |
| 6,313,745 B1 | 11/2001 | Suzuki |
| 6,330,589 B1 | 12/2001 | Kennedy |
| 6,333,973 B1 | 12/2001 | Smith et al. |
| 6,346,881 B1 | 2/2002 | Davidson |
| 6,346,952 B1 | 2/2002 | Shtivelman |
| D454,349 S | 3/2002 | Makidera et al. |
| 6,360,101 B1 | 3/2002 | Irvin |
| 6,363,349 B1 | 3/2002 | Urs et al. |
| 6,369,482 B1 | 4/2002 | Rink, Jr. et al. |
| 6,370,018 B1 | 4/2002 | Miller, Jr. et al. |
| D456,794 S | 5/2002 | Laverick et al. |
| 6,389,290 B1 | 5/2002 | Kikinis et al. |
| 6,396,482 B1 | 5/2002 | Griffin et al. |
| 6,404,761 B1 | 6/2002 | Snelling et al. |
| 6,415,138 B2 | 7/2002 | Sirola et al. |
| 6,424,845 B1 | 7/2002 | Emmoft et al. |
| D462,354 S | 9/2002 | Kimbre et al. |
| 6,452,588 B2 | 9/2002 | Griffin et al. |
| 6,456,234 B1 | 9/2002 | Johnson |
| D464,962 S | 10/2002 | Macgregor et al. |
| 6,463,154 B1 | 10/2002 | Patel |
| 6,487,180 B1 | 11/2002 | Borgstahl et al. |
| D466,714 S | 12/2002 | Grosfillex et al. |
| 6,489,950 B1 | 12/2002 | Griffin et al. |
| D468,714 S | 1/2003 | Maruska et al. |
| D469,749 S | 2/2003 | Kim |
| D470,842 S | 2/2003 | Bhatia et al. |
| 6,516,202 B1 | 2/2003 | Hawkins et al. |
| D471,559 S | 3/2003 | De |
| 6,532,368 B1 | 3/2003 | Hild et al. |
| 6,542,750 B2 | 4/2003 | Hendrey et al. |
| 6,553,236 B1 | 4/2003 | Dunko et al. |
| 6,560,461 B1 | 5/2003 | Fomukong et al. |
| D477,597 S | 7/2003 | Laverick et al. |
| 6,594,230 B1 * | 7/2003 | Yaker ................... H04M 7/006 370/221 |
| 6,601,093 B1 | 7/2003 | Peters |
| 6,611,254 B1 | 8/2003 | Griffin et al. |
| 6,611,255 B2 | 8/2003 | Griffin et al. |
| 6,618,593 B1 | 9/2003 | Drutman et al. |
| 6,628,938 B1 | 9/2003 | Rachabathuni et al. |
| 6,630,944 B1 | 10/2003 | Kakuta et al. |
| 6,633,761 B1 | 10/2003 | Singhal et al. |
| 6,658,254 B1 | 12/2003 | Purdy et al. |
| 6,671,735 B1 | 12/2003 | Bender |
| 6,677,968 B1 * | 1/2004 | Appelman ............ G06Q 10/10 709/210 |
| 6,681,108 B1 | 1/2004 | Terry et al. |
| 6,684,068 B1 | 1/2004 | Tikka et al. |
| 6,687,608 B2 | 2/2004 | Sugimoto et al. |

(56) References Cited

U.S. PATENT DOCUMENTS

| | | |
|---|---|---|
| 6,687,763 B2 | 2/2004 | Kimura et al. |
| D488,478 S | 4/2004 | Laverick et al. |
| 6,731,613 B1 | 5/2004 | Provance |
| 6,751,453 B2 | 6/2004 | Schemers et al. |
| 6,757,718 B1 | 6/2004 | Halverson et al. |
| 6,763,235 B2 | 7/2004 | Imai |
| 6,772,195 B1 * | 8/2004 | Hatlelid .............. G06F 3/04815 345/419 |
| 6,772,331 B1 | 8/2004 | Hind et al. |
| 6,778,644 B1 | 8/2004 | Jenkins et al. |
| 6,799,033 B2 | 9/2004 | Kanefsky |
| 6,831,563 B1 | 12/2004 | Contractor |
| 6,832,178 B1 | 12/2004 | Fernandez et al. |
| 6,847,823 B2 | 1/2005 | Lehikoinen et al. |
| 6,867,763 B2 | 3/2005 | Griffin et al. |
| 6,870,828 B1 | 3/2005 | Giordano, III |
| 6,873,317 B1 | 3/2005 | Griffin et al. |
| 6,885,362 B2 | 4/2005 | Suomela |
| 6,891,529 B2 | 5/2005 | Ladouceur et al. |
| 6,898,620 B1 * | 5/2005 | Ludwig ................ H04M 3/567 348/14.09 |
| 6,907,134 B1 | 6/2005 | Yamada et al. |
| 6,919,879 B2 | 7/2005 | Griffin et al. |
| 6,920,328 B2 | 7/2005 | Wollrab |
| 6,934,664 B1 | 8/2005 | Webb et al. |
| 6,938,067 B2 | 8/2005 | Hershenson |
| 6,941,270 B1 | 9/2005 | Hannula |
| 6,981,223 B2 | 12/2005 | Becker et al. |
| 6,982,962 B1 | 1/2006 | Lunsford et al. |
| 7,006,817 B2 | 2/2006 | Awada et al. |
| 7,007,239 B1 | 2/2006 | Hawkins et al. |
| 7,016,539 B1 | 3/2006 | Silver et al. |
| 7,017,047 B2 | 3/2006 | Vanska et al. |
| D518,820 S | 4/2006 | Hawkins et al. |
| D518,825 S | 4/2006 | Hawkins et al. |
| D519,502 S | 4/2006 | Hawkins et al. |
| 7,028,263 B2 | 4/2006 | Maguire |
| 7,035,382 B1 | 4/2006 | Shin et al. |
| 7,054,441 B2 | 5/2006 | Pletikosa |
| 7,061,403 B2 | 6/2006 | Fux |
| 7,084,758 B1 | 8/2006 | Cole |
| 7,103,010 B2 | 9/2006 | Melideo |
| 7,103,370 B1 | 9/2006 | Creemer |
| 7,103,388 B2 | 9/2006 | Scott |
| 7,164,885 B2 | 1/2007 | Jonsson et al. |
| 7,192,235 B2 | 3/2007 | Blight et al. |
| 7,212,827 B1 | 5/2007 | Veschl |
| 7,266,379 B2 | 9/2007 | Blight et al. |
| 7,266,584 B2 | 9/2007 | Mullen et al. |
| 7,274,299 B2 | 9/2007 | Osman |
| 7,328,242 B1 | 2/2008 | McCarthy et al. |
| 7,336,964 B2 | 2/2008 | Casey |
| 7,353,034 B2 | 4/2008 | Haney |
| 7,360,248 B1 | 4/2008 | Kanevsky et al. |
| 7,383,307 B2 | 6/2008 | Kirkland et al. |
| 7,421,690 B2 | 9/2008 | Forstall et al. |
| 7,424,447 B2 | 9/2008 | Fuzell-Casey et al. |
| 7,533,342 B1 * | 5/2009 | Vialle .................... H04M 1/56 345/169 |
| 7,583,972 B2 | 9/2009 | Clipsham |
| 7,602,756 B2 | 10/2009 | Gu et al. |
| 7,613,427 B2 | 11/2009 | Blight et al. |
| 7,613,428 B2 | 11/2009 | Blight et al. |
| 7,616,748 B1 * | 11/2009 | Katz .................... H04M 3/436 379/200 |
| 7,657,281 B2 | 2/2010 | Eibye |
| 7,672,681 B1 | 3/2010 | Beyer, Jr. |
| 7,805,719 B2 | 9/2010 | O'Neill |
| 7,856,248 B1 | 12/2010 | Fujisaki |
| 7,890,089 B1 | 2/2011 | Fujisaki |
| 7,890,136 B1 | 2/2011 | Fujisaki |
| 7,912,480 B2 | 3/2011 | Moosavi et al. |
| 8,073,431 B2 | 12/2011 | Blight et al. |
| 8,213,389 B2 | 7/2012 | Bush et al. |
| 8,401,032 B2 | 3/2013 | Hundscheidt et al. |
| 8,532,276 B2 * | 9/2013 | Altberg .................. H04M 3/42 370/260 |
| 9,031,583 B2 | 5/2015 | Pereira et al. |
| 9,140,552 B2 | 9/2015 | Pereira et al. |
| 2001/0006889 A1 | 7/2001 | Kraft |
| 2001/0021649 A1 | 9/2001 | Kinnunen et al. |
| 2001/0025309 A1 | 9/2001 | Macleod et al. |
| 2001/0044312 A1 * | 11/2001 | Yamane ................. H04W 4/02 455/456.6 |
| 2002/0010617 A1 | 1/2002 | Hamaguchi et al. |
| 2002/0016735 A1 | 2/2002 | Runge et al. |
| 2002/0019243 A1 | 2/2002 | Zhang et al. |
| 2002/0019584 A1 | 2/2002 | Schulze et al. |
| 2002/0034947 A1 * | 3/2002 | Soliman ................ H04W 36/12 455/436 |
| 2002/0036991 A1 | 3/2002 | Inoue |
| 2002/0044136 A1 | 4/2002 | Griffin et al. |
| 2002/0061031 A1 | 5/2002 | Sugar et al. |
| 2002/0069218 A1 | 6/2002 | Sull et al. |
| 2002/0078075 A1 | 6/2002 | Colson et al. |
| 2002/0086680 A1 | 7/2002 | Hunzinger |
| 2002/0115453 A1 | 8/2002 | Poulin et al. |
| 2002/0115476 A1 | 8/2002 | Padawer et al. |
| 2002/0136184 A1 | 9/2002 | Liang et al. |
| 2002/0147614 A1 | 10/2002 | Doerr et al. |
| 2002/0147717 A1 | 10/2002 | Barros et al. |
| 2002/0184418 A1 | 12/2002 | Blight |
| 2002/0190957 A1 | 12/2002 | Lee et al. |
| 2002/0194498 A1 | 12/2002 | Blight et al. |
| 2003/0005048 A1 | 1/2003 | Risalvato |
| 2003/0013461 A1 | 1/2003 | Mizune et al. |
| 2003/0022682 A1 | 1/2003 | Weston et al. |
| 2003/0033582 A1 | 2/2003 | Klein et al. |
| 2003/0052907 A1 | 3/2003 | Rekimoto |
| 2003/0054846 A1 | 3/2003 | Parry |
| 2003/0065788 A1 | 4/2003 | Salomaki |
| 2003/0070176 A1 | 4/2003 | Parker et al. |
| 2003/0087602 A1 | 5/2003 | Kammer |
| 2003/0114174 A1 | 6/2003 | Walsh et al. |
| 2003/0134648 A1 | 7/2003 | Reed et al. |
| 2003/0149527 A1 | 8/2003 | Sikila |
| 2003/0233650 A1 * | 12/2003 | Zaner .................... G06Q 10/10 725/32 |
| 2004/0031058 A1 | 2/2004 | Reisman |
| 2004/0137884 A1 | 7/2004 | Engstrom et al. |
| 2004/0166829 A1 | 8/2004 | Nakae et al. |
| 2004/0176107 A1 | 9/2004 | Chadha |
| 2004/0185883 A1 | 9/2004 | Rukman |
| 2004/0192311 A1 | 9/2004 | Koskinen et al. |
| 2004/0193499 A1 | 9/2004 | Ortiz et al. |
| 2004/0203847 A1 | 10/2004 | Knauerhase et al. |
| 2004/0207522 A1 | 10/2004 | Mcgee et al. |
| 2004/0218609 A1 | 11/2004 | Foster et al. |
| 2004/0233159 A1 | 11/2004 | Badarneh |
| 2004/0235464 A1 | 11/2004 | Korkalo et al. |
| 2004/0239639 A1 | 12/2004 | Stavely et al. |
| 2004/0249776 A1 | 12/2004 | Horvitz et al. |
| 2004/0266398 A1 | 12/2004 | Adamczyk et al. |
| 2005/0038876 A1 | 2/2005 | Chaudhuri |
| 2005/0043036 A1 | 2/2005 | Ioppe et al. |
| 2005/0043037 A1 | 2/2005 | Ioppe et al. |
| 2005/0097189 A1 | 5/2005 | Kashi |
| 2005/0153747 A1 * | 7/2005 | Egami .................. H04M 1/663 455/567 |
| 2005/0181803 A1 | 8/2005 | Weaver et al. |
| 2005/0227711 A1 | 10/2005 | Orwant et al. |
| 2006/0022048 A1 | 2/2006 | Johnson |
| 2006/0030339 A1 | 2/2006 | Zhovnirovsky et al. |
| 2006/0034434 A1 | 2/2006 | Kashi |
| 2006/0061488 A1 | 3/2006 | Dunton |
| 2006/0089792 A1 | 4/2006 | Manber et al. |
| 2006/0095331 A1 | 5/2006 | O'Malley et al. |
| 2006/0095348 A1 | 5/2006 | Jones et al. |
| 2006/0230137 A1 | 10/2006 | Gare et al. |
| 2006/0265508 A1 | 11/2006 | Angel et al. |
| 2007/0005715 A1 | 1/2007 | Levasseur et al. |
| 2007/0036286 A1 | 2/2007 | Champlin et al. |
| 2007/0060174 A1 | 3/2007 | Newton et al. |
| 2007/0091861 A1 | 4/2007 | Gupta et al. |

(56) References Cited

U.S. PATENT DOCUMENTS

| | | |
|---|---|---|
| 2007/0149208 A1 | 6/2007 | Syrbe et al. |
| 2007/0185980 A1 | 8/2007 | Abraham et al. |
| 2007/0192277 A1 | 8/2007 | Jackson |
| 2007/0198432 A1 | 8/2007 | Pitroda et al. |
| 2007/0200732 A1 | 8/2007 | Bachmaier |
| 2007/0202886 A1 | 8/2007 | Dhebri et al. |
| 2007/0202887 A1 | 8/2007 | Counts et al. |
| 2007/0207733 A1 | 9/2007 | Wong et al. |
| 2007/0225004 A1 | 9/2007 | Tang et al. |
| 2007/0243862 A1 | 10/2007 | Coskun et al. |
| 2007/0244758 A1 | 10/2007 | Xie |
| 2007/0271367 A1 | 11/2007 | Yardeni et al. |
| 2007/0282621 A1* | 12/2007 | Altman ............... G06Q 10/10 705/319 |
| 2008/0002820 A1* | 1/2008 | Shtiegman ...... H04L 29/06027 379/211.02 |
| 2008/0020786 A1 | 1/2008 | Smith et al. |
| 2008/0021637 A1 | 1/2008 | Staton et al. |
| 2008/0036653 A1 | 2/2008 | Huston |
| 2008/0037721 A1 | 2/2008 | Yao et al. |
| 2008/0045173 A1 | 2/2008 | Park et al. |
| 2008/0045234 A1 | 2/2008 | Reed |
| 2008/0045236 A1 | 2/2008 | Nahon et al. |
| 2008/0070593 A1 | 3/2008 | Altman et al. |
| 2008/0104173 A1 | 5/2008 | Wilcox et al. |
| 2008/0125102 A1 | 5/2008 | Abel et al. |
| 2008/0132251 A1 | 6/2008 | Altman et al. |
| 2008/0132252 A1 | 6/2008 | Altman et al. |
| 2008/0134088 A1 | 6/2008 | Tse et al. |
| 2008/0139114 A1 | 6/2008 | Ranganathan |
| 2008/0167937 A1 | 7/2008 | Coughlin et al. |
| 2008/0172462 A1 | 7/2008 | Carrer et al. |
| 2008/0177994 A1 | 7/2008 | Mayer |
| 2008/0195312 A1 | 8/2008 | Aaron et al. |
| 2008/0222127 A1 | 9/2008 | Bergin |
| 2008/0254811 A1 | 10/2008 | Stewart |
| 2008/0281696 A1 | 11/2008 | Whitehead |
| 2009/0005018 A1 | 1/2009 | Forstall et al. |
| 2009/0061870 A1 | 3/2009 | Finkelstein et al. |
| 2009/0143056 A1 | 6/2009 | Tang et al. |
| 2009/0157658 A1 | 6/2009 | Bonev et al. |
| 2009/0157693 A1 | 6/2009 | Palahnuk |
| 2009/0158173 A1 | 6/2009 | Palahnuk et al. |
| 2009/0158186 A1 | 6/2009 | Bonev et al. |
| 2009/0158200 A1 | 6/2009 | Palahnuk et al. |
| 2009/0222481 A1 | 9/2009 | Fisher et al. |
| 2009/0298511 A1 | 12/2009 | Paulson |
| 2009/0327908 A1 | 12/2009 | Hayton |
| 2009/0327909 A1 | 12/2009 | Hayton |
| 2010/0131584 A1 | 5/2010 | Johnson |
| 2011/0053605 A1 | 3/2011 | Carpio et al. |
| 2015/0304820 A1 | 10/2015 | Stewart |
| 2016/0037295 A1 | 2/2016 | Pereira et al. |

FOREIGN PATENT DOCUMENTS

| | | |
|---|---|---|
| EP | 1104151 A2 | 5/2001 |
| EP | 1117185 A1 | 7/2001 |
| EP | 1494488 A1 | 1/2005 |
| GB | 716548 | 10/2007 |
| KR | 20010109963 A | 12/2001 |
| KR | 20050087189 A | 8/2005 |
| KR | 20050095477 A | 9/2005 |
| KR | 20060008100 A | 1/2006 |
| WO | WO-03094534 A2 | 11/2003 |
| WO | WO-2007118125 A2 | 10/2007 |
| WO | WO-2008027836 A2 | 3/2008 |
| WO | WO-2008030967 A2 | 3/2008 |

OTHER PUBLICATIONS

A Hybrid Mobile-based Patient Location Tracking System for Personal Healthcare Applications; Chew, S.H.; Chong, P.A.; Gunawan, E.; Goh, K.W.; Kim, Y.; Soh, C.B.; Engineering in Medicine and Biology Society, 2006. EMBS '06. 28th Annual Inter. Conf. of the IEEE; Digital Object Identifier: 10.1109/IEMBS.2006.259579; Pub. 2006 , pp. 5188-5191.

A new naming and name resolution mapping system; Fuhong Lin; Jianyin Zhang; Qing Yu; Changjia Chen; Hongke Zhang; Informatics in Control, Automation and Robotics (CAR), 2010 2nd International Asia Conference on; vol. 3 Digital Object Identifier: 10.1109/CAR.2010.5456713; Publication Year: 2010 , pp. 377-380.

Aiken et al., "Microsoft Computer Dictionary," Microsoft Press, 5th ed., p. 523. May 1, 2002.

American Programmer, N.Y., American Programmer, Inc. (Dec. 1991), pp. 4-33.

"An Introduction to Mobile Messaging" [online], May 2003, Mobile Messaging, [retrieved on Dec. 10, 2004]. Retrieved from the Internet:< URL:http://www.lebodic.net/intro.htm.

At Last, Technology Hamesse [sic] One of the Most Powerf [sic]Forces known to Man., Foster City, GO Corporation, 1991, 14 pages.

AT&T New Release, NCR Cuts Price of 3170 Notebook Computer 11 to 19 Percent [online]. (Mar. 8, 1993), Retrieved from the Internet:< URL:http:>2 pages.</URL:http:>.

Bayir, et al ; Track me a web based location tracking and analysis system for smart phone Ubigu taus Computing Lab; Computer Science & Engineering; Publication Year; 2009 IEEE , pp. 117-122.

Bilal M., et al., "A Unique Global Mobile Network Service Tracker and User Centric Data Analyser", 2012 Seventh International Conference on Broadband, Wireless Computing, Communication and Applications (BWCCA), DOI: 10.1109/BWCCA.2012.94, Publication Year: 2012, pp. 534-539.

Carr, R.M., The Point of the Pen, Byte (Feb. 1991, Reprinted), 10 pages.

Chen, et al., "Secondary User Authentication based on Mobile Devices Location," 2010 Fifth IEEE International Conference on Networking, Architecture, and Storage, IEEE Computer Society, pp. 277-281.

Cohen M., et al., "A Multiuser Multiperspective Stereographic QTVR Browser Complemented by Java3D Visualizer and Emulator", Aug. 2007, vol. 16, Issue 4, pp. 414-438, DOI: 10.1162/pres. 16.4.414 MIT Press Journals.

"Contact Center Software", Retrieved at <<http://www.genesylab. com/products/contact_center_software.asp>, Sep. 26, 2008, 1 page.

Co-pending U.S. Appl. No. 12/510,002, filed Jul. 27, 2009.

"CosmoCall Universe", Retrieved at <<http://www.cosmocom.com/ productinfo/CollateralMaterials/CosmoCallAgentFeatures.pdf>>, © 2002, 2 pages.

Cullen, A., Connecting With Your EO Cellular Module, Mountain View, EO, Inc., 1992, 1993, pp. ii-33.

Cullen, A., Getting Started With Your EO Personal Communicator, Mountain View, EO, Inc., 1992, 1993, pp. ii-74.

Cullen, A., Lookup Guide to the EO Personal Communicator, Mountain View, EO, Inc., 1992, 1993, pp. ii-320.

Debroy S., et al., "MyPULSE: Mobile Yellow Pages with User Interest and Location Sensing Ensemble", TENCON 2008-2008 IEEE Region 10 Conference, Nov. 2008, pp. 1-6.

Digital Cellular Telecommunications System (Phase 2) At Command Set for GSM Mobile Equipment (ME) (GSM 07.07 verson 7.4.0 Release 1998), ETSI TS 100 916 V7.4.0 (Nov. 1999), 126 pages. Available via website: http://www.ctiforum.com/standard/ standard/etsi/0707.pdf.

Digital Cellular Telecommunications System (Phase 2+); General Description of a GSM Public Land Mobile Network (PLMN) (GSM 01.02 version 6.0.1 Release 1997), ETSI TS 101 622 V6.0.1 (Feb. 2001), 23 pages.

Digital Cellular Telecommunications System (Phase 2+); Specification of the SIM Application Toolkit for the Subscriber Identity Module—Mobile Equipment (SIM—ME) interface (GSM 11.14 Version 5.2.0, Dec. 1996), ETSI, 56 pages.

Eckardt T.O., et al., "Beyond IN and UPT—A Personal Communications Support System Based on TMN Concepts", Selected Areas in Communications, IEEE Journal on, vol. 15, Issue.7, Sep. 1997, pp. 1308-1314.

(56) References Cited

OTHER PUBLICATIONS

Energy efficient scheduling in 4G smart phones for Mobile Hotspot application; Keshav, K.; Indukuri, V.R.; Venkataram, P. Communications (NCC), 2012 Nation Conference on; Digital Object Identifier: 10.1109/NNCC.2012.6176904 Publication Year: 2012 , pp. 1-5.
Fasbender et al., "Any Network, Any Terminal, Anywhere," IEEE Personal Communications, Apr. 1999, pp. 22-30, IEEE Press. 1999.
First responder location and tracking using Synthetic Aperture Navigation ; Haas, Lin; Harlacher, Marc; Position Location and Navigation Sumposium (PLANS), 2010 IEEE/ION; Digital Object Identifier: 10.1109/PLANS.2010.5507250 Publication Year: 2010 , pp. 483-487.
Gao L., et al., "Travel-light: A Model for the Dynamic Assembly of Mega Machines", Proceedings of 16th International Conference on Computer Communications and Networks, ICCCN, Aug. 2007, pp. 63-68, DOI: 10.1109/1CCCN.2007.4317798.
GeoServ: A Distributed Urban Sensing Platform; Jong Hoon Ahnn; Uichin Lee; Hyun Jin Moon; Cluster, Cloud and Grid Computing (CCGrid), 2011 11th IEEE/ACM International Symposium on; Digital Object Identifier: 10.1109/CCGrid.2011.10 Publication Year: 2011 , pp. 164-173.
Go Corporation Information Statement, (Nov. 8, 1993), 228 pages.
Hadjiefthymiades et al., "ESW4: Enhanced Scheme for WWW Computing in Wireless Communication Environments," ACM SIGCOMM Computer Communication Review, vol. 29, Issue 5, pp. 24-35, ACM Press, Oct. 1999.
Hewlett Packard, Products and services, (http://www.hp.com) Nov. 11, 2001.
IBM Selects Racotek Data/voice Communications Services to Interface With Touchmobile Product, PR Newswire (Jan. 25, 1993), 2 pages.
IBM's Touchmobile Helps Field Workers Collect Data at the Touch of a Finger, PR Newswire (Jan. 26, 1993), 2 pages.
IBM TouchMobile Information and Planning Guide, International Business Machines Incorporated (Mar. 1993), 20 pages.
IBM TouchMobile Solution for Data Capture and Communication, Keeping Your Business Moving in the 90s, International Business Machines Incorporated (Jan. 1993), 13 pages.
"Siemens HiPath ProCenter Multimedia", Retrieved at<<http://health.siemens.com/portfolio/documents/comm_infrastr/contact_centers/hipath_procenter.pdf>>, © 2006, 5 pages.
Ikei Y., et al., "K-eXplorer: Cellular Phone Ubiquitous Real-World Interface with Distributed K-Stations", 17th International Conference on Artificial Reality and Telexistence, Nov. 2007, pp. 164-171, DOI: 10.1109/ICAT.2007.4414630.
Internet Telephony Manager (ITM) User Guide, XP002413107, Dec. 1, 1996, pp. 1-5.
Irfan G., et al., "Blind Channel Identification and Projection Receiver Determination For Multicode and Multirate Situations in DS-COMA Systems", 2001, IEEE. XP002233922; pp. 2197-2200.
Jing, J., et al., "Client Server Computing in Mobile Environments", ACM Computing Surveys, (Jul. 1999), pp. 117-157, vol. 31, Issue 2, ACM Press.
Khan A.S.K., et al., "LOC: Location-aware opportunistic content forwarding using direction vectors", Computers & Informatics (ISCI), IEEE Symposium on 2013, DOI: 10.1109/ISCI.2013. 6612400, Publication Year 2013, pp. 184-189.
Kim S., et al., "Ontology based location reasoning method using smart phone data", 2015 International Conference on Information Networking (ICOIN), DOI: 10.1109/ICOIN.2015.7057957, Publication Year: 2015, pp. 509-514.
Koyama, et al; An agent based mobile phone groupware system using location information; Database and Expert Systems Applications, 2002. Proceedings. 13th International Workshop on; Digital Object Identifier: 10.11 09/DEXA.2002.1 045873; Publication Year: 2002, pp. 37-41.
Kupfer, et al., "Information Technology," Fortune, Aug. 22, 1994, U.S.A., pp. 111-118.
Liu H., et al., "Estimating users' home and work locations leveraging large-scale crowd-sourced smartphone data", Communications Magazine, IEEE, vol. 53, Issue: 3; DOI: 10.1109/MCOM. 2015.7060485, Publication Year: 2015, pp. 71-79.
Location based reconfigurable cell site diversity techniques for LED-ID system; Uddin, M.S.; Yeong Min Jang; ICT Convergence (ICTC), 2011 International Conference on; Digital Object Identifier: 10.1109/ICTC.2011.6082653 Publication Year: 2011 , pp. 523-526.
MacNeill, D., Messaging Card and NewtonMail: We Pick Up and Deliver, On The Go Magazine [online], (Oct. 13, 1993), Retrieved from the Internet:<URL:http://www.pencomputing.com/NewtonNotes. html> 2 pages.
MacNeill, D., Wireless Newtow Technology Goes to Work, On The Go Magazine [online]. (Sep. 8, 1993), Retrieved from the Internet:<URL:http:www.bencomputing.com/Newton/NewtonNotes1. html>, 2 pages.
Maki, K., The AT&T EO Travel Guide, N.Y., John Wiley & Sons, Inc., 1993, pp. iii-555.
New Riverside University Dictionary, published by The Riverside Publishing Company Copyright 1984 by Houghton Mifflin Company, 3 pages.
Nodits: Position Triggered Information and Messages; Gilbertson, P.; Edwards, R.; Coulton, P.; Consumer Electronics, 2006. ISCE '06. 2006 IEEE Tenth International Symposium on; Digital Object Identifier: 10.1109/ISCE.2006.1689510 Publication Year: 2006 , pp. 1-3.
Nokia 6630 Users Guide, XP002413106, Mar. 28, 2006, pp. 1-109.
Nokia, Frequently Asked Questions; [online], [retrieved on Nov. 17, 2003],<http://www.nokia.co.in/nokia_apac/india/faqs_list/0,18778,39_41,00.html>.
Nokia Introduces Mobile Chat With Nokia 3310, [online], Sep. 1, 2000, [retrieved on Nov. 17, 2003],< http:..www.mobiletechnews.com/info/2000/09/01/142022.htm>.
Notice of Allowance for U.S. Appl. No. 11/706,872 (F&L Ref.: 035451-0287), dated Dec. 27, 2010, 7 pages.
Oosterman J., "Geolocation on the iPhone by automatic street sign reading", Image and Vision Computing New Zealand (IVCNZ), 25th International Conference of 2010, DOI: 10.1109/IVCNZ.2010. 6148877, Publication Year 2010, pp. 1-6.
"Open Architecture for Distributed Control", IEE Colloquium on Industrial Automation and Control: Distributed Control for Automation (Digest No. 1998/297), Mar. 1998, pp. 1/1-1/3, DOI: 10.1049/ic: 19980516.
Palm, Inc., Redacted Employee Agreement between Palm, Inc. and Amir Haghighat dated Apr. 9, 2007, 9 pages.
Palm TM m505 Handheld, printed from internet address: http:/www.palm.com/products/palmm505/ on Sep. 20, 2001 (5 views).
"PeopleSoft 8: Web-based Applications Armada", Retrieved at<<http://findarticles.com/p/articles/mi_qa3973/is_200009/ai_n8922878>, Sep. 26, 2008, 5 pages.
Perry T.S., "Eaglecrest: A Commuter's Dream", Communication is everything in the high-tech aerie in the foothills of the Sierra Nevada: it is designed to permit the professional to work at home, far from the madding crowd, Spectrum, IEEE, May 1985, vol. 22, Issue 5, pp. 69-73. DOI: 10.1109/MSPEC.1985.6370655.
Qin J., "High-efficiency and well-integrity method for dynamic acquisition of GNSS location information", Signal Processing Systems (ICSPS), 2nd International Conference on 2010, vol. 1, DOI: 10.1109/ICSPS.2010.5555549, Publication Year 2010, pp. V1-520-V1-524.
Radigan, et al., "Look Out Home Banking, Here Comes William the Conqueror," USBanker, Dec. 1994, U.S.A., pp. 22-26, 60.
Raman B., et al., "Universal Inbox: Providing Extensible Personal Mobility in an Integrated Communication Network", Third IEEE Workshop on Mobile Computing Systems and Applications, Dec. 2000, pp. 95-106, DOI: 10.1109/MCSA.2000.895385.
Rashid, et al; implementing location based information/advertising for existing mobile phone users in indoor/urban environments ; Mobile Business, 2005. ICMF3 2005. International Conference on; Digital Object identifier: 10.11 0911CMB.2005.45; Publication Year: 2005, pp. 377-383.
Reinhardt, et al., "Building the Data Highway," Byte, Mar. 1994, U.S.A., pp. 46-49, 52, 54, 56, 58, 60, 62, 63, 66, 68, 70, 72, 74.

(56) References Cited

OTHER PUBLICATIONS

Sang A., et al., "A Flexible Downlink Scheduling Scheme in Cellular Packet Data Systems", IEEE Transactions on Wireless Communications, Mar. 2006, vol. 5, Issue 3, pp. 568-577, DOI: 10.1109/TWC.2006.1611087.
Sang A., et al., "Real-Time QoS Over a Third-Generation (3G) Cellular Shared Downlink Channel", IEEE 64th Vehicular Technology Conference, VTC-2006 Fall, Sep. 2006, pp. 1-5, DOI: 10.11091VTCF.2006.276.
Schicker P., "Naming and Addressing in a Computer-Based Mail Environment", IEEE Transactions on Communications, vol. 30, Issue 1, Part 1, DOI: 10.1109/TCOM.1982.1095355, Publication Year 1982, pp. 46-52.
Schlender, B. R., Hot New PCs That Read Your Writing, Fortune (Feb. 11, 1991, Reprinted), 6 pages.
Screen Dumps on Microsoft Internet Explorer 6.0, 2001 pp. 1-13.
Secure Access Central for Location-Based Applicationg in WLAN Systems; YounSun Cho; Lichun Bao; Mobiie Adhoc and Sensor-Systems (MASS), 2006 IEEE International Conference on; Digital Object Identifier: 10.1109/MOBHOC.2006.278664 Publication Year: 2006 , pp. 852-857.
Sevanto, et al., "Introducing quality-of-service and traffic classed in wireless mobile networks," 1998, pp. 21-29, Proceedings of the 1st ACM international workshop on Wireless mobile multimedia.
Sharma et a., "Intelligent Agents in Call Management System," Integration of Knowledge Intensive Multi-Agent Systems International Conference, XP010793134, Apr. 18, 2005 pp. 9-14.
Sharma P., et al., A case for MANET-aware content centric networking of smartphones World of Wireless, Mobile and Multimedia Networks (WoWMoM), 2012 IEEE International Symposium on a Digital Object Identifier: 10.1109/WoWMoM.2012.6263714; Publication Year: 2012, pp. 1-6.
Skyhook Wireless, "How It Work", printed from internet address: http://developer.skyhookwireless.com/how-it-works/, on Apr. 12, 2007, 2 pages.
Stock, R., The World of Messaging An Introduction to Personal Communications, Mountain View, EO, Inc., 1992, 1993, pp. ii-69.
Supplementary European Search Report—EP09773978—Search Authority—The Hague—dated Jun. 7, 2011 (142197EP).
Terauchi D., et al., "ULP: A Location Platform that can Handle Multiple Location Representations", International Symposium on Applications and the Internet, SAINT 2008, pp. 349-352, DOI: 10.1109/SAINT.2008.58.
T-Mobile Products; Handhelds (http://www.tmobile.com) Sep. 28, 2002, 2 pages.
T-Mobile Products; Sidekick (http://www.tmobile.com) Sep. 28, 2002, 3 pages.
Tonella P., et al., "Restructuring multilingual web sites", Software Maintenance, Proceedings, International Conference on 2002, DOI: 10.1109/ICSM.2002.1167784, Publication Year 2002, pp. 290-299.
Toshiba Computer Systems Group (htto://www.toshiba,com) May 28, 2002, 1 page.
Toshiba Computer Systems Group: Pocket PC e570 (http://www.pda.toshiba.com) Jul. 7, 2001, 2 pages.
UWB in Heterogeneous Access Networks: location-aware services; Cluzeaud, P.; Bucaille, I.; Sierra, A.; Choliz, J.; Positioning Navigation and Communication (WPNC), 2010 7th Workshop on; Digital Object Identifier: 10.1109/WPNC.2010.5653619 Publication Year: 2010 , pp. 257-263.
Vinayaik T., et al., "Multiple Access Interference Resistant Channel Acquisition for Wideband COMA Signals", 2000, IEEE, pp. 956-960.
Weib D.,et al., "Zone Services—An Approach for Location-Based Data Collection", The 8th IEEE International Conference on and Enterprise Computing, E-Commerce, and E-Services (CEC/EEE'06), E-Commerce, and E-Services, The 3rd IEEE International Conference on, Jun. 2006, pp. 1-8.
Zafeiropoulos A., et al., "A Lightweight Approach for Providing Location based Content Retrieval", IEEE 18th International Symposium on Personal, Indoor and Mobile Radio Communications, PIMRC, Sep. 2007, pp. 1-5, DOI: 10.1109/PIMRC.2007.4394638.
Zhou J., et al., "A Selector Method for Providing Mobile Location Estimation Services within a Radio Cellular Network", Proceedings of the First International Conference on Availability, Reliability and Security, ARES 2006, Apr. 2006, 8 Pages, DOI: 10.1109/ARES.2006.16.
"Zumbra Email", Retrieved at<<http://www.hmc.edu/about/administrativeoffices/cis1/docs1/central1/email1/zimbra1/email.html>, Sep. 26, 2008, 6 pages.

* cited by examiner

SYSTEM AND METHOD FOR MONITORING LOCATIONS OF MOBILE DEVICES

CROSS-REFERENCE TO RELATED APPLICATIONS

The present application is a divisional of co-pending, commonly assigned, U.S. patent application Ser. No. 14/788,497 entitled "SYSTEM AND METHOD FOR MONITORING LOCATIONS OF MOBILE DEVICES" filed Jun. 30, 2015, which itself is a divisional of U.S. patent application Ser. No. 11/786,550 entitled, "SYSTEM AND METHOD FOR MONITORING LOCATIONS OF MOBILE DEVICES" filed Apr. 11, 2007, the disclosure of which is hereby incorporated herein by reference.

BACKGROUND

The present application relates generally to the field of location-based services, and more particularly, to providing location-based data or notifications based upon the location and/or availability of one or more electronic devices.

Some location-based services may permit a user of an electronic device to obtain a graphical display of the location of other electronic devices. This is often accomplished using a server-based system, where various electronic devices may broadcast their location to a server that monitors the locations of the various electronic devices and provides location data to be used, for example, in generating a map of the device locations. One problem associated with this type of system is that with the increasing use of electronic devices, and in particular mobile computing devices, in order to accurately track the location of large numbers of such devices, servers must often send and/or receive significant numbers of communications, often creating delays in response time and increasing operational costs.

Further, some location-based services take into account only the location of an electronic device. In many instances, a user of an electronic device may be unavailable, or may desire to not be bothered by incoming messages such as phone calls, emails, etc. In these cases, the current location-based services may be unable to accommodate the needs and/or desires of many users.

Accordingly, there is a need for an electronic device that is able to provide location-based notifications without the need of a server that monitors the locations of various electronic devices. Further, there is also a need for an electronic device that takes into account the availability of one or more electronic devices in providing location-based data or notifications.

The teachings herein extend to those embodiments which are within the scope of the appended claims, regardless of whether they accomplish one or more of the above-identified needs.

DETAILED DESCRIPTION

Figure 1:
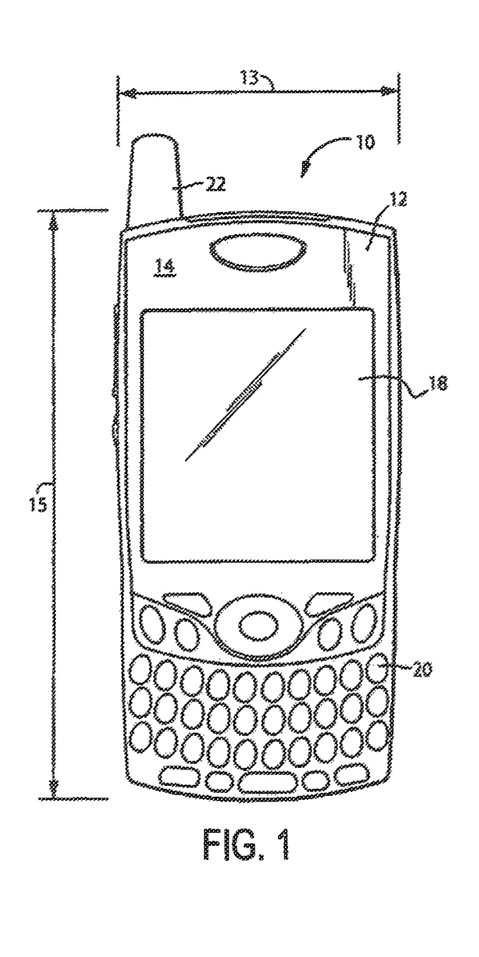
FIG. 1 is a front view of a mobile computing device according to an exemplary embodiment.
Figure 2:
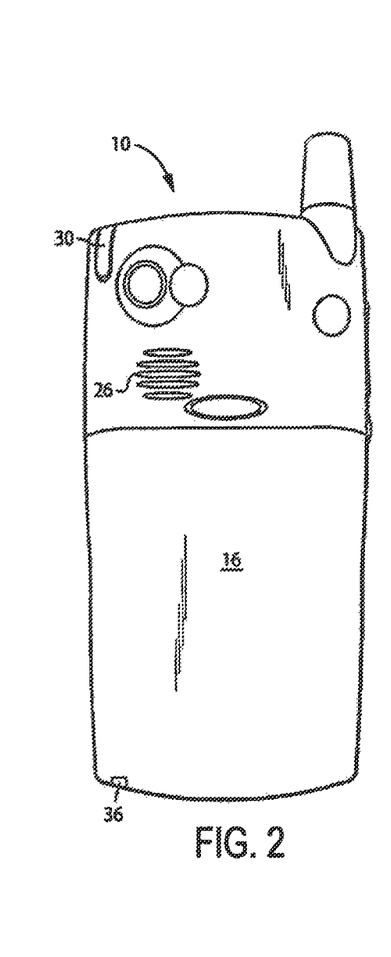
FIG. 2 is a back view of the mobile computing device of FIG. 1 according to an exemplary embodiment.
Figure 3:
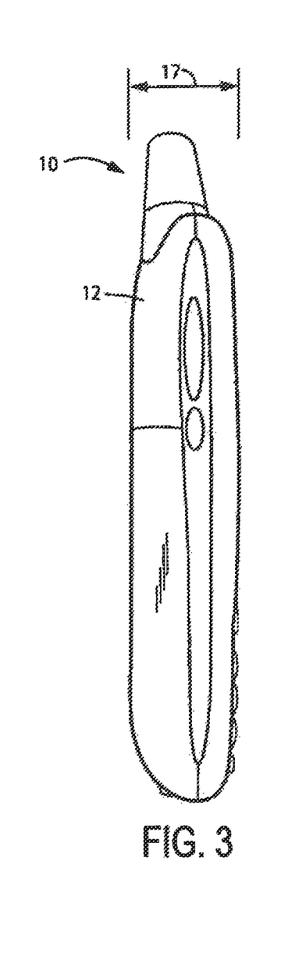
FIG. 3 is a side view of the mobile computing device of FIG. 1 according to an exemplary embodiment.

Referring to FIGS. 1-3, a mobile computing device 10 is shown. The teachings herein can be applied to device 10 or to other electronic devices (e.g., a desktop computer), mobile computing devices (e.g., a laptop computer) or handheld computing devices, such as a personal digital assistant (PDA), smartphone, mobile telephone, personal navigation device, etc. According to one embodiment, device 10 is a smartphone, which is a combination mobile telephone and handheld computer having PDA functionality. PDA functionality can comprise one or more of personal information management (e.g., including personal data applications such as email, calendar, phone, text messaging, etc.), database functions, word processing, spreadsheets, voice memo recording, Global Positioning System (GPS) functionality, etc. Device 10 is configured to synchronize personal information from these applications with a computer (e.g., a desktop, laptop, server, etc.). Device 10 is further configured to receive and operate additional applications provided to device 10 after manufacture, e.g., via wired or wireless download, SecureDigital card, etc.

As shown in FIGS. 1-3, device 10 includes a housing 12 and a front side 14 and a back side 16. Device 10 further comprises a display 18 and a user input device 20 (e.g., a QWERTY keyboard, buttons, touch screen, speech recognition engine, etc.). Display 18 can comprise a touch screen display in order to provide user input to a processor 40 (see FIG. 4) to control functions, such as to select options displayed on display 18, enter text input to device 10, or enter other types of input. Display 18 also provides images (see, e.g., FIG. 6) that are displayed and may be viewed by users of device 10. User input device 20 can provide similar inputs as those of touch screen display 18. Device 10 can further comprise a speaker 26, and a stylus 30 to assist the user in making selections on display 18.

According to an exemplary embodiment, housing 12 is configured to hold a screen such as display 18 in a fixed relationship above a user input device such as user input device 20 in a substantially parallel or same plane. This fixed relationship excludes a hinged or movable relationship between the screen and the user input device (e.g., a plurality of keys) in the fixed embodiment. Device 10 may be a handheld computer, which is a computer small enough to be carried in a typical front pocket found in a pair of pants, comprising such devices as typical mobile telephones and personal digital assistants, but excluding typical laptop computers and tablet PCs.

In various embodiments, housing 12 could be any size, shape, and dimension. In some embodiments, housing 12 has a width 13 of no more than about 200 mm or, alternatively, no more than about 100 mm. According to some of these embodiments, housing 12 has a width 13 of no more than about 85 mm or, alternatively, no more than about 65 mm. According to some embodiments, housing 12 has a width 13 of at least about 30 mm or, alternatively, at least about 50 mm. According to some of these embodiments, housing 12 has a width 13 of at least about 55 mm.

In some embodiments, housing 12 has a length 15 of no more than about 200 mm or, alternatively, no more than about 150 mm. According to some of these embodiments, housing 12 has a length 15 or no more than about 135 mm or, alternatively, no more than about 125 mm. According to some embodiments, housing 12 has a length 15 of at least about 70 mm or, alternatively, at least about 100 mm. According to some of these embodiments, housing 12 has a length 15 of at least about 100 mm.

In some embodiments, housing 12 has a thickness 17 of no more than about 150 mm or, alternatively, no more than about 50 mm. According to some of these embodiments, housing 12 has a thickness 17 of no more than about 30 mm or, alternatively, no more than about 25 mm. According to some embodiments, housing 12 has a thickness 17 of at least about 10 mm or, alternatively, at least about 15 mm. According to some of these embodiments, housing 12 has a thickness 17 of at least about 50 mm.

In some embodiments, housing 12 has a volume of up to about 2500 cubic centimeters or, alternatively, up to about 1500 cubic centimeters. In some alternative embodiments, housing 12 has a volume of up to about 1000 cubic centimeters or, alternatively, up to about 600 cubic centimeters.

Figure 4:
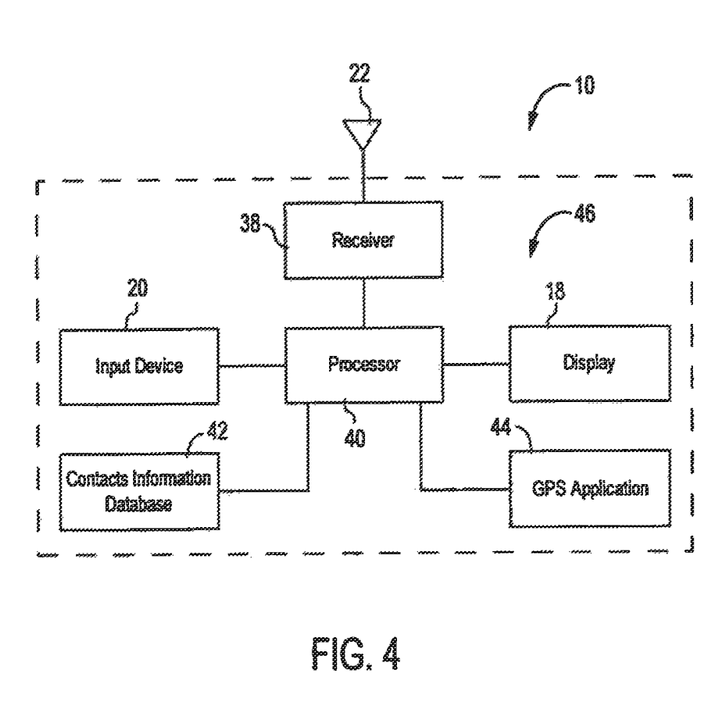
FIG. 4 is a block diagram of the mobile computing device of FIG. 1 according to an exemplary embodiment.

Referring now to FIG. 4, device 10 comprises a processing circuit 46 comprising a processor 40. Processor 40 can comprise one or more microprocessors, microcontrollers, and other analog and/or digital circuit components configured to perform the functions described herein. Processor 40 comprises one or more memories (e.g., random access memory, read only memory, flash, etc.) configured to store software applications provided during manufacture or subsequent to manufacture by the user or by a distributor of device 10. In one embodiment, processor 40 can comprise a first applications microprocessor configured to run a variety of personal information management applications, such as email, a calendar, contacts, etc., and a second, radio processor on a separate chip or as part of a dual-core chip with the application processor. The radio processor is configured to operate telephony functionality. Device 10 can be configured for cellular radio telephone communication, such as Code Division Multiple Access (CDMA), Global System for Mobile Communications (GSM), Third Generation (3G) systems such as Wide-Band CDMA (WCDMA), or other cellular radio telephone technologies. Device 10 can further be configured for data communication functionality, for example, via GSM with General Packet Radio Service (GPRS) systems (GSM/GPRS), CDMA/1×RTT systems, Enhanced Data Rates for Global Evolution (EDGE) systems, Evolution Data Only or Evolution Data Optimized (EV-DO), and/or other data communication technologies.

Device 10 comprises a receiver 38 which comprises analog and/or digital electrical components configured to receive and transmit wireless signals via antenna 22 to provide cellular telephone and/or data communications with a fixed wireless access point, such as a cellular telephone tower, in conjunction with a network carrier, such as, Verizon Wireless, Sprint, etc. Device 10 can further comprise circuitry to provide communication over a local area network, such as Ethernet or according to an IEEE 802.11x standard or a personal area network, such as a Bluetooth or infrared communication technology.

Device 10 further comprises a microphone 36 (see FIG. 2) configured to receive audio signals, such as voice signals, from a user or other person in the vicinity of device 10, typically by way of spoken words. Alternatively or in addition, processor 40 can further be configured to provide video conferencing capabilities by displaying on display 18 video from a remote participant to a video conference, by providing a video camera on device 10 for providing images to the remote participant, by providing text messaging, two-way audio streaming in full- and/or half-duplex mode, etc.

Device 10 further comprises a location determining application, shown in FIG. 3 as GPS application 44. GPS application 44 can communicate with and provide the location of device 10 at any given time. Device 10 may employ one or more location determination techniques including, for example, Global Positioning System (GPS) techniques, Cell Global Identity (CGI) techniques, CGI including timing advance (TA) techniques, Enhanced Forward Link Trilateration (EFLT) techniques, Time Difference of Arrival (TDOA) techniques, Angle of Arrival (AOA) techniques, Advanced Forward Link Trilateration (AFTL) techniques, Observed Time Difference of Arrival (OTDOA), Enhanced Observed Time Difference (EOTD) techniques, Assisted GPS (AGPS) techniques, hybrid techniques (e.g., GPS/CGI, AGPS/CGI, GPS/AFTL or AGPS/AFTL for CDMA networks, GPS/EOTD or AGPS/EOTD for GSM/GPRS networks, GPS/OTDOA or AGPS/OTDOA for UMTS networks), and so forth.

Device 10 may be arranged to operate in one or more location determination modes including, for example, a standalone mode, a mobile station (MS) assisted mode, and/or an MS-based mode. In a standalone mode, such as a standalone GPS mode, device 10 may be arranged to autonomously determine its location without real-time network interaction or support. When operating in an MS-assisted mode or an MS-based mode, however, device 10 may be arranged to communicate over a radio access network (e.g., UMTS radio access network) with a location determination entity such as a location proxy server (LPS) and/or a mobile positioning center (MPC).

Figure 5:
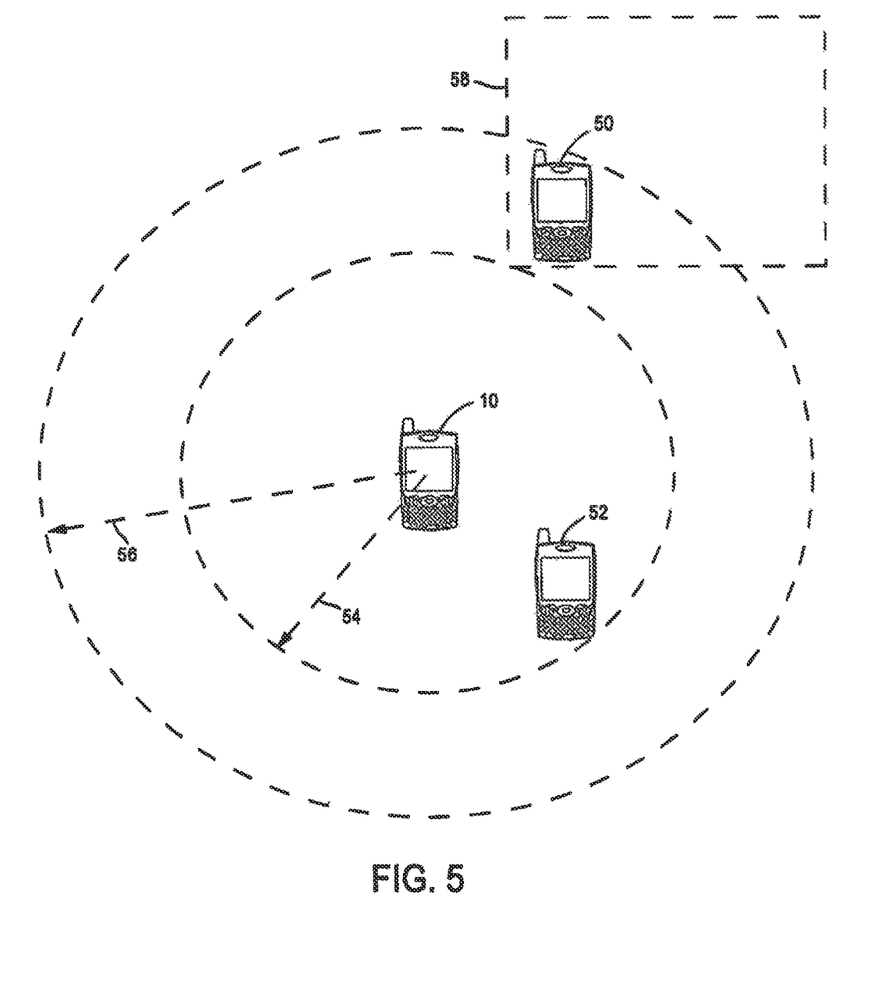
FIG. 5. is an illustration of an electronic device wirelessly communicating with other electronic devices according to an exemplary embodiment.

Referring now to FIG. 5, according to an exemplary embodiment, device 10 is configured to communicate with one or more other electronic devices, shown in FIG. 4 as mobile computing devices 50 and 52. According to one embodiment, device 10 requests the location data for devices 50, 52 from devices 50, 52 via wireless communications. The wireless communications may include communications via a cellular communications network, Bluetooth transceivers, infrared communications, etc.

Processor 40 provides a notification (e.g., email, phone call, text message, graphical map display, etc.) to device 10 and/or devices 50, 52 based upon location data for devices 50, 52. For example, the notification may comprise a graphical display of a map that includes the location of device 10 and/or the location of one or more other electronic devices. Alternatively, the notification may comprise a message (e.g., an email, text message, etc.) that is automatically generated and sent to device 10 (and/or one or more other electronic devices). For example, a user of device 10 may receive an email indicating that a particular device is within a certain proximity of device 10 or at a certain geographic location.

According to an exemplary embodiment, devices 50, 52 (and/or their respective users) may belong to a predetermined database of devices, such as contacts information database 42 shown in FIG. 3, from which processor 40 requests location data. For example, devices 50, 52 may be associated with user data stored in a contacts application (e.g., an electronic contacts application designed to store contact information such as a user's name, phone number, email address, etc.). According to an alternative embodiment, devices 50, 52 may be associated with users that have been placed on a short list of contacts (e.g., a "friends list," a subset of a contacts listing, etc.). Various other methods of identifying devices 50, 52 may also be used. For example, device 50 or 52 may be associated with a second user that the user of device 10 has chosen to request location data from, and the second user may not belong to any particular group, list, etc. According to another embodiment, rather than a user identifying a subset of contacts (e.g., from a contacts application) from which to request location data, a user may instead identify users associated with devices from which the user of device 10 does not wish to request location data. Processor 40 may then request location data from those devices except those identified.

Processor 40 may request the location data in response to receiving an input from a user of device 10. According to an alternative embodiment, processor 40 may be configured to request the location data automatically based upon time or location parameters. For example, processor 40 may request location data every hour (or every ½ hour, every minute, etc.), or the location data may be requested on a continuous basis. Device 10 may also permit a user to identify discrete times at which location data is to be requested. Alternatively, processor 40 may request the location data based upon the location of device 10. For example, if a user wants to know if a particular device is nearby whenever the user passes a specific location, the user may configure processor 40 to request the location data of the particular device whenever device 10 is at or near the specific location. The specific location and/or time parameters may be configured by a user of device 10 and may vary based upon the devices to which the request for location data is sent.

After sending the request for the location data, device 10 receives the location data from devices 50, 52. The location data may include information such as the current geographic locations of devices 50, 52, the current distance between devices 50, 52 and device 10, a point of interest nearest to or in the vicinity of devices 50 and/or 52, and so on. Other location data may also be provided according to various other alternative embodiments.

According to an exemplary embodiment, the receipt of location data is permission-based. In order for a user of device 10 to receive the location data for a particular device (even if the particular device is associated with a user on a "friends list"), the user of the particular device must first grant permission for the location data to be communicated to device 10. If no permission has been granted, device 10 will not receive a response from the other device. According to one embodiment, an indication that permission has not been granted may be provided to a user of device 10. Devices 50, 52 may be configured to store a user-defined list of contacts which do and/or do not have permission to request location data associated with devices 50, 52.

Once the location data is received by device 10, processor 40 may send out one or more notifications to device 10 and/or devices 50, 52 based upon the location data. For example, a user of device 10 may wish to simply know the locations of devices 50, 52. In such a case, processor 40 may provide a notification, such as the graphical display shown in FIG. 6, indicating the location of devices 50, 52. According to another embodiment, processor 40 may provide a display of only those devices within a certain distance of device 10. For example, referring to FIG. 5, a user may wish to know whether any other users on a friends list are within a certain distance, such as distance 54 (which may be user-adjustable or pre-set by the application); of device 10. In the embodiment shown in FIG. 5, only device 52 is within distance 54 of device 10. Therefore, a user of device 10 may be provided with a notification including a graphical map displaying the geographic location of device 52 (e.g., and preferably device 10). If the user of device 10 requests location data for any devices within distance 56, both devices 50, 52 may be displayed to the user.

According to another embodiment, processor 40 may provide the notification based on the geographic location of devices 50, 52, rather than the proximity of devices 50, 52 to device 10. For example, referring further to FIG. 5, a user may wish to determine whether any other users on a friends list are currently in a specific city or other specific location 58. Processor 40 requests the location data from all of the users on the friends list, but displays only those in the specific location. For example, referring to FIG. 5, a user may wish to know whether any of devices 50, 52 are within location 58. Because only device 52 is located within location 58, the user of device 10 may be provided with a notification including a map of location 58 and the particular location of device 50 and optionally directions (e.g. turn-by-turn, graphical, etc.) to location 58.

Figure 6:
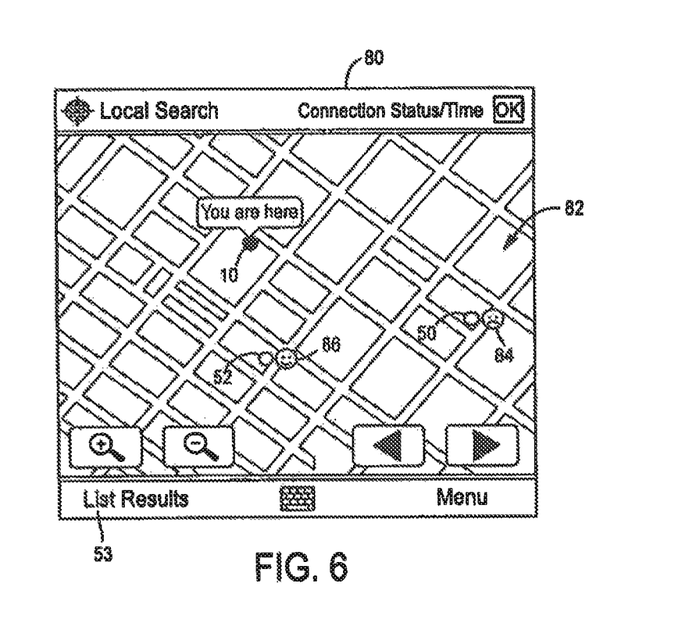
FIG. 6 is an illustration of an image of a map indicating the location and/or availability of one or more electronic devices according to an exemplary embodiment.
Figure 8:
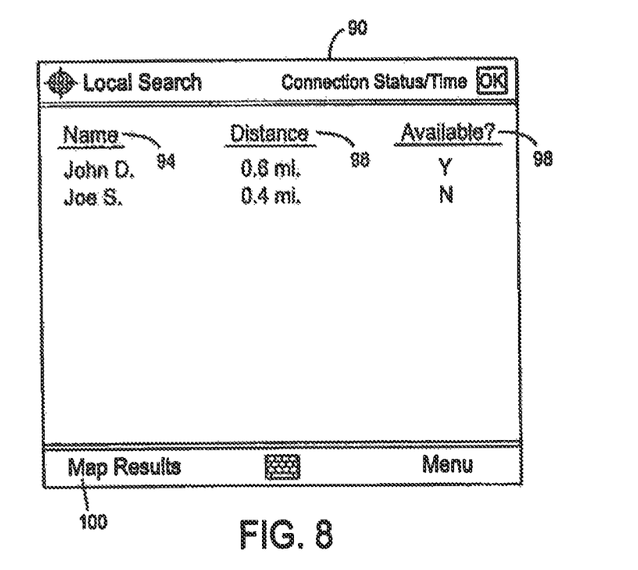
FIG. 8 is an illustration of an image of a listing providing distance and/or availability information for one or more electronic devices according to an exemplary embodiment.

Referring now to FIG. 6, according to one embodiment, the notification includes a graphical image 80 of a map 82 that indicates the geographic location of devices 50, 52. Image 80 may further indicate the geographic location of device 10. Other information may further be provided via image 80, for example, driving directions to/from one or more other devices, points of interest located within the displayed geographic area, etc. According to one embodiment a user may select (e.g. highlight hover over, etc.) one of the devices displayed on image 80, and be provided with an overlay menu of options (e.g. "email," "call," etc.) from which to select in order to contact the selected device. According to another embodiment, a user may toggle between a graphical display such as that shown in FIG. 6 and a textual listing of the nearby devices (see FIG. 8). For example, a user may select the "List results" option 53 shown in FIG. 6 to view a textual listing 90 of the devices as shown in FIG. 8. For example, listing 90 may include name information 94, distance information (to/from) 96, availability information 98, etc. Further, textual listing 90 may include toggle option 100, permitting a user to return to a graphical display such as that shown in FIG. 6.

As shown in FIG. 6, the notification includes a graphical display of the location of device 10, and one or more other devices 50, 52. According to various other embodiments, the notification may comprise an email, a text message, etc. or other notification or message that may be sent automatically to one or more of device 10 and/or other mobile devices such as devices 50, 52. For example, upon determining that device 50 is within a specified distance of device 10, processor 40 may generate and send an email to one or both of the devices (e.g. "John is nearby.").

As discussed with respect to FIGS. 5 and 6, processor 40 requests location data from one or more other electronic devices (e.g., devices 50, 52 shown in FIG. 5) and provides a notification to device 10 and/or the other electronic device(s) based on the location data. According to an alternative embodiment, providing the notification and/or receiving the location data from the other electronic devices is also based upon the availability data (e.g., presence) of the other devices. Availability data reflects the availability of a particular device and mar represent various states such as "available," "unavailable," "do not disturb," "silent/vibrate mode only," etc. Availability data may reflect the availability of a device to, for example, receive and respond to emails, phone calls, text messages, and other messages. Availability data may also reflect the availability of a user as defined by, for example, an electronic calendar storing appointments and indicating that the user is available/unavailable during a certain time period. Availability data may also reflect an availability status selected by a user (e.g., do not disturb, silent mode, etc.). Further yet, availability data may take into account whether a device is currently powered ON or OFF. Other factors may further be taken into account in determining the availability of a particular device.

According to one embodiment, device 10 requests and receives the availability data for a particular electronic device from the electronic device, e.g., one of devices 50, 52, rather than from, for example, a server that collects, stores, and updates availability data for a number of electronic devices. According to another embodiment, the availability data is provided by a server or a third party source.

Processor 40 may display an indication of the availability of particular devices along with the locations of the particular devices. For example, as shown in FIG. 6, image 80 shows devices 50, 52 having availability indicators 84, 86, respectively. Indicators 84, 86 may be icons that represent the availability of a particular device (e.g., a smiling face for available, a frowning face for unavailable, etc.). Alternatively, indicators 84, 86 may include textual phrases representing the availability of the devices (e.g., "available," "busy," etc.). Indicators 84, 86 may take other forms according to various other alternative embodiments.

According to one embodiment, when a particular device is unavailable, processor 40 does not receive the location data for the device. Device 10 may then provide an indication that the device is unavailable without providing the location of the device. According to another embodiment, if a particular device is unavailable, neither the availability nor the location of the device is provided.

Figure 7:
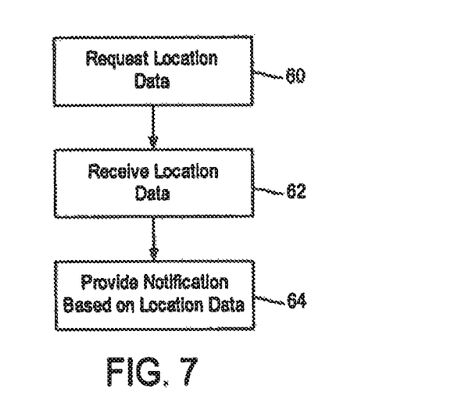
FIG. 7 is a flowchart illustrating a method of providing a notification based on location-based data according to an exemplary embodiment.

Referring now to FIG. 7, a flowchart illustrating the process of providing a notification based upon location data is shown. At step 60, a request is sent" from a first mobile device to a second mobile device for location data for the second mobile device. At step 62, the first mobile device receives the location data for the second mobile device from the second mobile device. The location data may be communicated to/from the first and second mobile devices via wireless communications such as cellular communications, Bluetooth-based communications, etc. At step 64, the processor of the first mobile device provides a notification (e.g., a graphical display of a map, an email, text message, phone call, or other message, etc.) based on the location data. The notification may be sent to one or both of the first and second electronic devices, and may include the location and/or availability data.

As discussed above, processor 40 may take availability data for other electronic devices into account in addition to location data in determining whether to provide a notification and the content of the notification. For example, referring again to FIG. 7, if processor 40 additionally requests availability data at step 60, whether the location data is received may be dependent upon the availability data (e.g., if the particular device is "unavailable," location data for the particular device may not be received by device 10).

As discussed with respect to the FIGURES, device 10 requests and receives location data from another electronic device, such as device 50. According to an alternative embodiment, a server may be provided that tracks the location of the devices and generates a notification to one or both devices based on the location of the devices (e.g., based on whether the two devices are within a certain distance or the two devices are within a specific geographic area). A server-based architecture may utilize many of the same features as the peer to peer architecture, including friends lists, permission requirements, availability-based notifications, etc.

While the detailed drawings, specific examples and particular formulations given describe exemplary embodiments, they serve the purpose of illustration only. The hardware and software configurations shown and described may differ depending on the chosen performance characteristics and physical characteristics of the computing devices. The systems shown and described are not limited to the precise details and conditions disclosed. Furthermore, other substitutions, modifications, changes, and omissions may be made in the design, operating conditions, and arrangement of the exemplary embodiments without departing from the scope of the invention as expressed in the appended claims.

What is claimed is:

1. A method comprising:
in response to a determination that a first mobile device is within a predetermined distance of a second mobile device:
receiving, at the first mobile device, a notification comprising data regarding the second mobile device, and
displaying the notification via a display coupled to the first mobile device, wherein the displayed notification displays at least one image based on the received data of the notification;
receiving an input, via an interface of the first mobile device, selecting an image of the at least one image;
based at least on the image of the at least one image being selected, receiving, at the first mobile device, a permission status indicating the first mobile device has been granted permission to exchange communications with the second mobile device;
based on receiving the permission status, providing, at the first mobile device, an option to contact, via at least one of a message, a text message, an email, a call, a video conference, or a graphic, the second mobile device via the first mobile device; and
receiving, at the first mobile device, directions to a location of the second mobile device.

2. The method of claim 1, wherein the first mobile device is denied the option to contact the second mobile device based on the first mobile device being denied permission to exchange communications with the second mobile device.

3. The method of claim 1, wherein a user of the first mobile device identifies at least one time period in which determining that the first mobile device is within the predetermined distance of the second mobile device is to be performed.

4. The method of claim 1, the method further comprising:
receiving, at the first mobile device, an availability status indication of the second mobile device based on an availability status selection of a user of the second mobile device.

5. The method of claim 1, wherein a user of the first mobile device is temporarily denied information about the second mobile device based on an availability status selection of a user of the second mobile device.

6. The method of claim 1, wherein the selecting of the image indicates that a user of the first mobile device desires to contact a user of the second mobile device, and wherein the determination that the first mobile device is within the predetermined distance of the second mobile device is performed at the first mobile device.

7. The method of claim 1, wherein the notification is received via a wireless network, and wherein the displayed notification includes an option to switch between display of the at least one image and a presentation of textual information associated with the second mobile device, the textual information based at least in part on the data regarding the second mobile device.

8. The method of claim 1, wherein:
the notification is received, via a communication network, from a server or the second mobile device.

9. A first mobile device comprising:
one or more processors configured to:
in response to a determination that the first mobile device is a within a predetermined distance of a second mobile device:
receive a notification comprising data regarding the second mobile device for use in displaying at least one image, and
display the notification to a user of the first mobile device, wherein the displayed notification displays the at least one image based on the received data of the notification;
receive an input that selects an image of the at least one image;
based at least on the image of the at least one image being selected, receive a permission status indicating the first mobile device has been granted permission to exchange communications with the second mobile device;
based on the received permission status, provide an option to contact, via at least one of a message, a text message, an email, a call, a video conference, or a graphic, the second mobile device via the first mobile device; and
receive directions to a location of the second mobile device.

10. The first mobile device of claim 9, wherein the first mobile device is denied the option to contact the second mobile device based on the first mobile device being denied permission to exchange communications with the second mobile device.

11. The first mobile device of claim 9, wherein the one or more processors is further configured to:
receive an indication of at least one time period in which determining whether the first mobile device is within the predetermined distance of the second mobile device is to be performed.

12. The first mobile device of claim 9, wherein the one or more processors is further configured to receive an availability status indication of the second mobile device based on an availability status selection of a user of the second mobile device.

13. The first mobile device of claim 12, wherein the first mobile device is temporarily denied information about the second mobile device based on the availability status selection.

14. The first mobile device of claim 9, wherein:
the notification is received, via a communication network, from a server or the second mobile device.

15. The first mobile device of claim 9, wherein the input that selects the image indicates that a user of the first mobile device desires to contact a user of the second mobile device, and wherein the determination that the first mobile device is within the predetermined distance of the second mobile device is performed at the first mobile device.

16. The first mobile device of claim 9, wherein the notification is received via a wireless network, and wherein the displayed notification includes an option to switch between display of the at least one image and a presentation of textual information associated with the second mobile device, the textual information based at least in part on the data regarding the second mobile device.

17. The first mobile device of claim 9, the one or more processors further configured to:
capture at least one image by a camera of the first mobile device;
send the at least one image from the first mobile device, the at least one image to be received by the second mobile device; and
determine that the first mobile device is within the predetermined distance of the second mobile device.

18. A system comprising:
means for receiving, at a first mobile device in response to a determination that the first mobile device is within a predetermined distance of a second mobile device, a notification comprising data regarding the second mobile device,
means for displaying, at the first mobile device, the notification, wherein the displayed notification displays at least one image based on the data;
means for receiving an input, from a user of the first mobile device, selecting an image of the at least one image;
means for receiving, based at least on selection of the image, a permission status indicating the first mobile device has been granted permission to exchange communications with the second mobile device;
means for providing, based at least on the received permission status, an option to contact the second mobile device via the first mobile device; and
means for receiving directions to a location of the second mobile device.

19. A non-transitory computer-readable medium having program code recorded thereon, the program code comprising:
code for receiving, at a first mobile device in response to a determination that the first mobile device is within a predetermined distance of a second mobile device, a notification comprising data regarding the second mobile device for use in displaying at least one image, and
code for displaying the notification via a display of the first mobile device, wherein the displayed notification displays the at least one image based on the data;
code for receiving input, via an interface of the first mobile device, selecting an image of the at least one image;
code for receiving, based at least on the image of the at least one image being selected, a permission status indicating the first mobile device has been granted permission to exchange communications with the second mobile device;
code for providing, based at least on the received permission status, an option to contact, via at least one of a message, a text message, an email, a call, a video conference, or a graphic, the second mobile device via the first mobile device; and
code for receiving directions to a location of the second mobile device.

* * * * *